E. B. CAMPBELL.
PACKING RING.
APPLICATION FILED JUNE 16, 1915.
1,181,642.
Patented May 2, 1916.
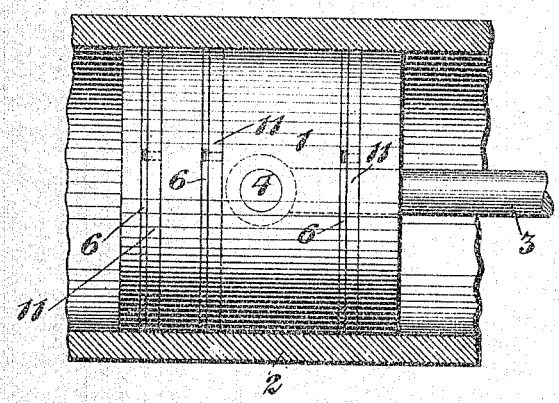
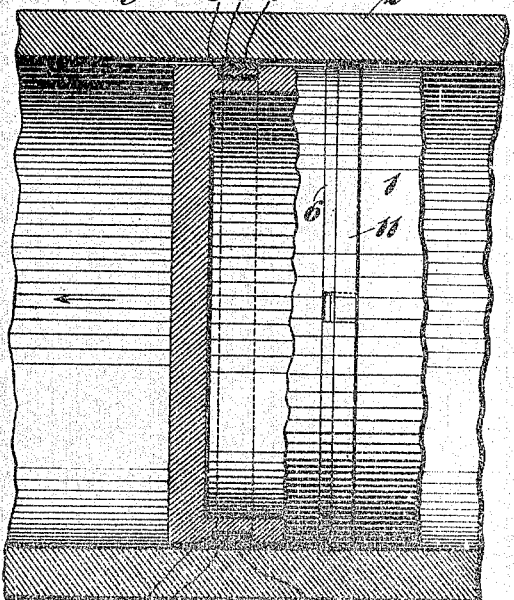
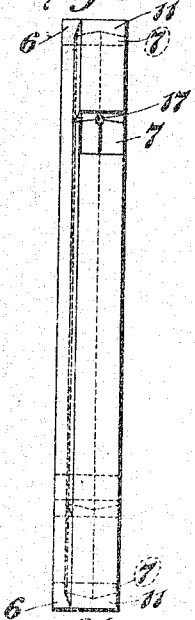
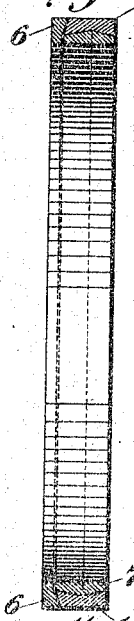
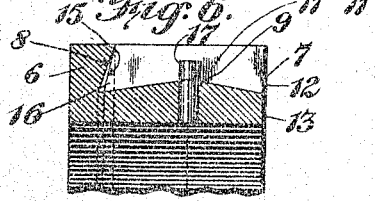
Attest:
Charles A. Becker
N. G. Butler
Inventor.
Edward B. Campbell
by Pippy McCleland
His Attorneys

UNITED STATES PATENT OFFICE.

EDWARD B. CAMPBELL, OF ST. LOUIS, MISSOURI.

PACKING-RING.

1,181,642.  Specification of Letters Patent.  Patented May 2, 1916.

Application filed June 16, 1915. Serial No. 34,522.

*To all whom it may concern:*

Be it known that I, EDWARD B. CAMPBELL, a citizen of the United States, residing at the city of St. Louis and State of Missouri, have invented a new and useful Packing-Ring, of which the following is a specification.

This invention relates to packing rings for reciprocating pistons, and it consists of two resilient open rings provided with novel coöperating structural features whereby each ring positively prevents fouling of the ends of the other ring with the ports of the cylinder during the reciprocation of the piston; and it consists further of novel coöperating features for holding the two rings in proper adjustment with respect to each other; and it consists further in the combination of improved packing rings with the piston so that the packing rings are expanded by the pressure of the gas or actuating fluid within the inner packing ring effectively to press the peripheries of both packing rings closely against the interior of the cylinder, the packing rings being arranged to act in the manner of a valve to prevent escape of the gas or actuating fluid across or beyond the packing rings.

An object of the invention is to provide an improved packing, comprising two rings of the open resilient type, one of which is provided with a portion adapted to operate against the surface of the cylinder, which portion is provided with an oblique wall on one side, said ring being also provided with a thinner portion having a peripheral ridge, in combination with another ring encircling the thinner portion of the first-named ring and having an oblique wall on one edge adapted to coöperate with the oblique wall on the side of the first-named ring, and also having an interior groove receiving the peripheral ridge on said first-named ring whereby each of said two rings constitutes a positive retainer for preventing the ends of the other ring from fouling with the ports of the cylinder during reciprocation of the piston.

Another object is to provide an improved packing comprising two telescoping or overlapping rings, the inner one of which is provided with an exterior projecting portion which is received within a corresponding recess in the outer ring, whereby the two rings are retained in proper adjustment, one of said rings also having a groove receiving an extended portion of the other ring whereby the ends of both rings are prevented from becoming fouled in the ports on the cylinder.

A further object is to provide in combination with a piston having a circumferential groove, an improved packing comprising two open resilient rings seated in said groove and arranged so that the gas or actuating fluid passing between the piston and the wall of the cylinder will enter the groove in which said rings are seated and, passing between said rings and the inner wall of the groove, will expand both rings and press them closely against the cylinder and against the rear wall of the groove, thus causing said rings to perform the functions of valves or expanding cups under control of the gas or actuating fluid to form a hermetic closure preventing passage of the gas or actuating fluid beyond said rings.

With the foregoing and other objects in view I have illustrated a preferred embodiment of my invention in the accompanying drawings in which—

Figure 1 is a sectional view of a cylinder having a reciprocating piston mounted therein, and illustrating a number of my improved packings mounted on said piston. Fig. 2 is a view illustrating the cylinder and a part of the piston and one of the packings on the piston in section, clearly illustrating the position of the rings when performing the functions of a valve under control of the gas or actuating fluid. Fig. 3 is a view of the packing illustrating the two rings in assembled adjustment detached from the piston. Fig. 4 is a sectional view of the two rings in assembled adjustment. Fig. 5 is an enlarged sectional view illustrating the construction of the two rings by which a passage for a lubricant is provided. Fig. 6 is a similar sectional view illustrating the abutment carried by one of the rings for limiting the relative movement of the two rings.

The piston 1 is of the usual reciprocating type, and operates within a cylinder 2, and is provided with a piston rod 3 pivotally connected to the piston at 4, whereby the power of the piston is transmitted to the driving mechanism. The piston 1 is provided with a number of circumferential grooves 5. A packing is to be mounted in each of the circumferential grooves 5 and to reciprocate with the piston in the operation of the engine. It will be understood that the piston is to be equipped with a plurality of packings, and I have illustrated the piston in Fig. 1 as being equipped with three packings. Each packing is composed of two coöperating rings, one of which includes an outer portion 6 the periphery of which is adapted to press and operate against the interior of the cylinder. The ring including the outer portion 6 also includes an inner portion 7, which may be described as a laterally extending annular flange whose interior diameter is the same as the interior diameter of the part 6 and whose exterior diameter is less than the exterior diameter of said part 6. The part 6 has an oblique wall 8 at the side from which the inner portion 7 extends, so that there is an annular groove or channel between the oblique wall 8 and the outer wall of the part 7. The part 7 is provided with an annular ridge or rib 9, so that the periphery of said part 7 includes two oblique walls both of which extend obliquely toward the axis of the ring from the summit or apex of the ridge or rib 9, as will be clearly understood by reference to Figs. 5 and 6. The coöperating ring 11 is also of the resilient open type and is adapted to encircle or telescope upon the part 7 of the ring above described, so that the side edge 12 of said ring 11 is in the same plane with the side edge 13 of the part 7. The ring 11 is formed with an interior channel or groove which receives the ridge or rib 9 on the part 7, so that when the two rings are placed together, one within the other in the manner illustrated, the ridge or rib 9 being received within the groove or channel holds the two rings in proper adjustment so that they cannot become separated or detached. The side of the ring 11 which is toward the ring part 6 has an oblique wall 15 adapted to engage or abut against the oblique wall 8. There is thus formed a flange 16 on the ring 11, which flange is received within the groove or channel between the oblique wall 8 and the ring part 7. It is obvious that by this construction the ends of the ring 11 will be positively held within the same arcuate plane as the periphery of the adjacent ring part 6, thus preventing either of the ends of the ring 11 from becoming caught or fouled in the ports of the cylinder during reciprocation of the piston. It will be understood that it is essential to assemble the two rings so that the open spaces between the ends are out of alinement, and so that the body of each ring will cross the open space between the ends of the other ring. In order to limit relative movement of the two rings I provide a pin 17 which is rigid with the ring part 7, and which extends between the ends of the ring 11, thus limiting movement of the two rings, and preventing the two rings from working around so that the open ends thereof are brought together.

In the combination of the packing with the piston it is preferable that the groove 5 be slightly wider than the packing, so that the packing may have slight movement within the groove. This will be clearly understood by reference to Fig. 2, which illustrates the position of the packing in the groove which is adjacent to the end of the cylinder. The parts are illustrated in Fig. 2 in the position which they occupy when the piston is moving toward compression, during which movement the packing is pressed closely against the wall of the groove which is farthest from the end of the piston. The packing is mounted on the piston with the ring part 6 toward the end of the piston, so that the open space between the ends of the ring 6—7 forms a passage for the admission of the gas into the groove 5 between the inner wall of said groove and the inner wall of the ring 6—7. Obviously, the frictional contact of the packing with the interior of the cylinder will force the packing against the wall of the groove which is farthest from the end of the piston, thus forming a hermetic seal to prevent the gas or actuating fluid from escaping from the groove 5. The pressure of the gas or actuating fluid within the groove 5 and against the inner wall of the ring 6—7 increases as the compression is increased by the movement of the piston. Thus the gas or actuating fluid is utilized and the increasing pressure thereof increases the pressure of the packing against the cylinder and against the rear wall of the groove in which the packing is mounted.

The coöperating walls 8 and 15 are preferably formed in different planes of obliquity, so that there may be formed a small space between the adjacent side walls of the ring part 6 and the ring 11 for the passage of a lubricant between said rings to prevent adhesion thereof as a result of any accumulations of carbon or other substances. The ring 11 will be enabled to separate slightly from the outer wall of the ring part 7, thus permitting passage of the lubricant between all adjacent walls of the two rings. It will be understood that the movement of the two rings with respect to each other is not sufficient to remove the flange 16 from the groove in which it is seated, so that the ends of the ring 11 will be prevented from becoming caught or fouled in the cylinder ports.

It will be understood that there may be various alterations and modifications in the construction of the packing without departure from the spirit and scope of the invention. I do not restrict myself to exact features of construction, but I contemplate such modifications and variations as may be within the scope of the appended claims.

What I claim and desire to secure by Letters Patent of the United States is:

1. A packing comprising a ring part adapted to operate against the surface of the cylinder and having a straight side wall and an oblique side wall diverging outwardly from said straight wall, a laterally extending portion integral with said ring part on the same side as said oblique wall, a ring encircling said laterally extending portion and having a projection engaging under said oblique wall, whereby the ends of said second-named ring are held in the same annular plane with the periphery of said first-named ring part, and means in rigid connection with said laterally extending portion holding said second-named ring in position so that the side wall thereof opposite from said projection is in substantially the same plane as the side wall of said laterally extending portion of said first-named ring.

2. A packing, comprising a ring, a laterally extending portion integral with said ring, there being a groove between said ring and said laterally extending portion, a second ring encircling said laterally extending portion, a projection on said second ring engaging in said groove whereby outward pressure of said second ring is imparted to said first-named ring, means limiting lateral movement of said two rings with respect to each other, and means limiting rotary movement of said rings with respect to each other.

3. A packing, comprising a ring having an oblique wall on one side thereof, a laterally extending portion integral with said ring on the same side as said oblique wall, a rib encircling said laterally extending portion between said wall and the side of said laterally extending portion, a second ring encircling said laterally extending portion and having an interior groove receiving said rib, a passage for a lubricant between said rings, and means limiting rotary movement of said rings with respect to each other.

4. The combination with a piston having a circumferential groove therein, and a cylinder in which said piston is operatively mounted, of a ring of the resilient open type of less width than said groove mounted in said groove, whereby the actuating fluid may enter said groove between the open ends of said ring and press said ring against the cylinder, a second ring encircling a part of said first-named ring and extending across the space between the open ends of said first-named ring at one side of said first-named ring and bearing against the side wall of said groove effectively to prevent the passage of the actuating fluid from said groove, means whereby the periphery of each ring is held in annular alinement with the other ring, and means limiting relative rotation of said two rings.

5. A packing, comprising a ring, a laterally extending portion integral with said ring and being of less diameter than said ring, a rib encircling said laterally extending portion, a second ring encircling said laterally extending portion and having an interior groove receiving said rib whereby said second ring is held with its side wall approximately in the same plane as the side wall of said laterally extending portion, means whereby the periphery of each ring is held in annular alinement with the other ring, and an abutment on one of said rings limiting relative rotation of said rings.

In witness whereof, I have signed this specification in the presence of two subscribing witnesses.

EDWARD B. CAMPBELL.

Witnesses:
N. G. BUTLER,
JOHN D. RIPPEY.